(12) United States Patent
Tsugai et al.

(10) Patent No.: US 9,074,889 B2
(45) Date of Patent: Jul. 7, 2015

(54) VIBRATION GYRO HAVING BIAS CORRECTING FUNCTION

(71) Applicant: MITSUBISHI PRECISION CO., LTD., Koto-ku, Tokyo (JP)

(72) Inventors: Masahiro Tsugai, Kamakura (JP); Akitaka Uchimura, Kamakura (JP); Syuji Nakashita, Kamakura (JP)

(73) Assignee: Mitsubishi Precision Co., Ltd., Tokyo (JP)

( * ) Notice: Subject to any disclaimer, the term of this patent is extended or adjusted under 35 U.S.C. 154(b) by 345 days.

(21) Appl. No.: 13/759,929

(22) Filed: Feb. 5, 2013

(65) Prior Publication Data

US 2013/0298670 A1 Nov. 14, 2013

(30) Foreign Application Priority Data

May 8, 2012 (JP) .................................. 2012-106638
Sep. 19, 2012 (JP) .................................. 2012-205750

(51) Int. Cl.
*G01C 19/56* (2012.01)
*G01C 19/5705* (2012.01)
*G01C 19/574* (2012.01)

(52) U.S. Cl.
CPC ............ *G01C 19/56* (2013.01); *G01C 19/5705* (2013.01); *G01C 19/574* (2013.01)

(58) Field of Classification Search
CPC .................................................... G01C 19/574
See application file for complete search history.

(56) References Cited

U.S. PATENT DOCUMENTS 8,459,111 B1 * 6/2013 Mao ........................... 73/504.14
2007/0144255 A1 6/2007 Handrich et al.

FOREIGN PATENT DOCUMENTS

JP 2007-513344 5/2007

OTHER PUBLICATIONS

Clark, William A. et al.; "Surface Micromachined Z-Axis Vibratory Rate Gyroscope"; ; 1996; IEEE; 5pp.

* cited by examiner

*Primary Examiner* — John Chapman, Jr.
(74) *Attorney, Agent, or Firm* — Christie, Parker & Hale, LLP (57) ABSTRACT

A vibration gyro having a structure for canceling a quadrature error generated by structural asymmetricity due to production tolerance and a means for correcting a bias value when an angular velocity is zero. In order to apply a counter torque to a sense mass for canceling the quadrature error, left correction comb electrodes are fixed to a substrate adjacent to a left drive mass, and comb electrodes opposed to the correction comb electrodes are arranged on an inner portion of a frame member which constitutes the left drive mass. By applying DC voltage to the correction electrodes, electrostatic force, for canceling the leakage rotational displacement of the sense mass generated when the input angular velocity is zero, is generated.

6 Claims, 9 Drawing Sheets

II-II SECTION

FIG.3

III-III SECTION

VIBRATION GYRO HAVING BIAS CORRECTING FUNCTION

RELATED APPLICATIONS

The present application claims priority from Japanese Patent Application No. 2012-106638 filed on May 8, 2012, and Japanese Patent Application No. 2012-205750 filed on Sep. 19, 2012, the entire contents of which are fully incorporated herein by reference.

BACKGROUND OF THE INVENTION

1. Field of the Invention

The present invention relates to a vibration gyro, in particular, a vibration gyro having a bias correcting function, produced by a Micro-Electro-Mechanical-Systems (MEMS).

2. Description of the Related Art

Due to a micromachining technique rapidly developed since the 1990s, a large quantity of sensor structures can be produced in one process. For example, a bulk silicon wafer is bonded onto a silicon substrate having an insulating film or a glass substrate, and then the wafer is processed by chemical etching, such as wet etching or dry etching so as to form a mechanical sensor structure. As a sensor based on the MEMS technique, an acceleration sensor or a vibration gyro may be used, for example, in many fields including an automobile, inertia navigation, a digital camera, a game machine, etc.

In particular, a vibration gyro utilizes Coriolis force generated when a movable article capable of vibrating in one direction is subject to rotational motion. When a vibrating movable mass is subject to rotational motion, the movable mass is subject to Coriolis force which acts in the direction perpendicular to both the vibrating direction and the rotational direction, and then the movable mass is displaced in the acting direction of the Coriolis force. The movable mass is supported by a spring which allows the mass to be displaced in the acting direction, and thus the Coriolis force and an angular velocity generating the Coriolis force can be detected based on the displacement of the movable mass. The displacement of the movable mass can be determined based on, for example, capacitance change of a parallel plate-type capacitor or a comb-type capacitor, having a pair of parallel plate structures or a pair of comb structures, wherein one of the structures is fixed and the other is movable together with the movable mass.

As a means for improving output stability of a vibration gyro, a means for reducing or eliminating a leakage output (or a quadrature error) may be used. In the prior art documents below, a vibration gyro having a correcting means, which reduces the quadrature error for improving the bias stability, is disclosed.

In Japanese Unexamined Patent Publication (Kohyo) No. 2007-513344 (JPP'344), a Coriolis angular velocity meter having a first resonator 1, wherein first resonator 1 is configured as a combination system of first and second linear oscillators 3 and 4, first oscillator 3 is connected to a frame of the angular velocity meter via first spring elements $5_1$ to $5_4$, and second oscillator 4 is connected to first oscillator 3 via second spring elements $6_1$ and $6_2$. The angular velocity meter generates an electrostatic field ($11_1'$, $11_2'$, $10_1$ to $10_4$) capable of alternately changing alignment of oscillators 3 and 4. The electrostatic field has a device which generates constant load for changing alignment angles of first spring elements $5_1$ to $5_4$ relative to frames $7_3$ and $7_4$ of the angular velocity meter and/or alignment angles of second spring elements $6_1$ and $6_2$ relative to first oscillator 3; a device (45, 47) for determining a quadrature (orthogonal) bias of the Coriolis angular velocity meter; and a control loop (55, 56, 57) which controls the intensity of the electrostatic field corresponding to the determined quadrature bias.

Figure 3:
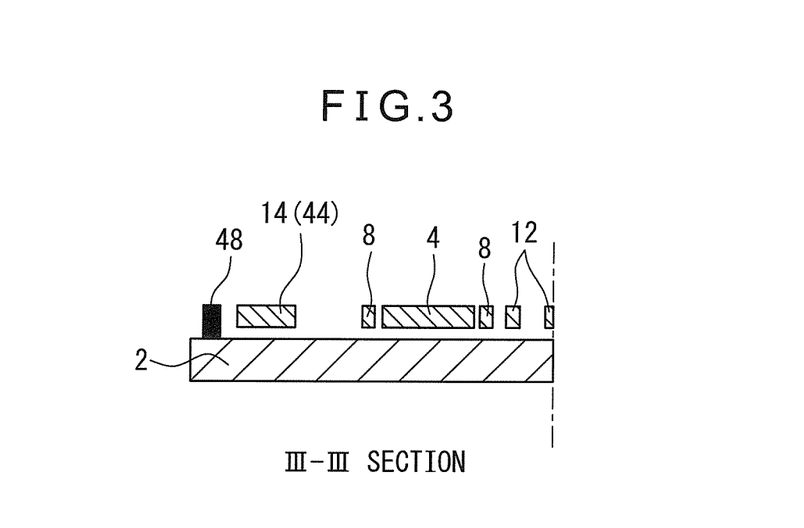
FIG. 3 is a cross-sectional view of the gyro along a line of FIG. 1.

In the angular velocity meter described in JPP'344, the first resonator (or first vibrating body) is displaceably supported by the four bended elements (or first spring elements) in the X-direction (X1 direction) parallel to the substrate surface, and the second resonator (or second vibrating body) is displaceably supported, inside the first vibrating body, by the two bent elements (or second spring elements) in the Y-direction (X2 direction) parallel to the substrate surface and perpendicular to X1 direction. The first vibrating body is driven so that the displacement oscillation of the first vibrating body occurs, when the angular velocity about the Z-axis is input, the displacement oscillation of the second vibrating body in the Y-direction occurs due to Coriolis force. By detecting the displacement oscillation in the Y-direction, the angular velocity about the Z-axis may be determined. In JPP'344, as shown in FIG. 3, the structures, each including the first and second vibrating bodies, are positioned on right and left sides, and the first vibrating bodies are connected to each other by a connecting spring so that the first vibrating bodies are driven at the opposite phases. It can be understood that, by detecting the reverse phase displacement of the second vibrating body at the time when the angular velocity is input, a displacement output having relatively small error, proportional to the angular velocity, may be obtained.

In the angular velocity meter described in JPP'344, when the first oscillators are driven at the opposite phases in the X-direction, the internal second oscillators are vibrated in the Y-direction (i.e., the sensing direction of the Coriolis force) due to structural unbalance caused by manufacturing tolerances of each component of the velocity meter. This is because the orthogonality between the driving direction (X-direction) and the sensing direction (Y-direction) is not maintained. Therefore, in JPP'344, a correction structure having an excitation electrode is arranged near the center of the second oscillator, so that the orthogonality is maintained (i.e., the alignment in the vibration direction is adjusted). Concretely, a DC voltage for correction, corresponding to a bias output voltage obtained by a sensor signal processing circuit, is applied to the excitation electrode, whereby the alignment is adjusted by electrostatic force. However, in JPP'344, due to the driving vibration of the first oscillator, the second oscillator suspended within the vibrating first oscillator is also excited in the X-direction by the same amount as the first oscillator. Therefore, in the configuration having the manufacturing tolerances, a gap (or a capacitance) between the second oscillator and a sensing fixed electrode for sensing a Y-direction displacement is varied. Accordingly, the configuration of JPP'344 may include an instable bias factor which may cause an error to be corrected, even in an ideal condition wherein the orthogonality is maintained without generating an alignment error.

Further, JPP'344 discloses a method for compensating the orthogonal bias, concretely, a closed loop method for determining a DC voltage applied to the excitation electrode, with reference to an orthogonal bias component which is generated when the orthogonality is not maintained. However, when input angular velocity Ω is alternately changed (AC-like), the orthogonal bias is generated even when the orthogonality is maintained, in view of the principle of the vibration gyro. Therefore, the appropriate compensation may not be carried out by the closed loop method with reference to the orthogonal bias component.

SUMMARY OF THE INVENTION

An object of the present invention is to provide a capacitive-detection-type vibration gyro, wherein a sense mass is elastically separated from a drive mass, the sense mass is not equally displaced corresponding to the driving vibration of the drive mass, and the gyro has a means for canceling the displacement of the sense mass (or quadrature error) generated by the structural asymmetricity due to the production tolerance and a means for correcting the bias value when the angular velocity is zero.

Accordingly, the invention provides a vibration gyro comprising: a sense mass fixed to a substrate by means of a second supporting element and configured to be rotatably excited about an axis perpendicular to a plane by a Coriolis force generated by an angular velocity; drive masses on right and left sides, each drive mass being suspended inside the sense mass by means of a first supporting element so that each drive mass may be driven and vibrated in one direction parallel to the plane, wherein the drive masses are connected to each other by means of a connecting spring having elasticity in a direction of driving-vibration of the drive masses so that the drive masses represent an anti-phase vibration mode wherein the drive masses are vibrated at opposite phases, wherein the sense mass is configured to not excited in the direction of the driving-vibration due to the driving-vibration of the drive masses, and wherein the vibration gyro further comprises a correction electrode positioned adjacent to the sense mass, the correction electrode being configured to generate an electrostatic force by an AC voltage applied to the correction electrode based on a phase of a monitor output of the driving-vibration of the drive masses when an angular velocity is not input, in order to cancel a rotational torque applied to the sense mass due to the driving-vibration of the drive masses.

In a preferred embodiment, the vibration gyro further comprises: a memory which stores AC voltage amplitude and its phase data for limiting a quadrature error or an orthogonal bias value of the vibration gyro, the data being associated with an operating temperature of the vibration gyro; and a temperature sensor which measures a temperature of the vibration gyro, wherein the vibration gyro further comprises a correction signal adjusting part which generating a correction signal for adjusting an amplitude of an AC control voltage with a specific phase applied to the correction electrode, based on a measured value of the temperature sensor and the AC voltage amplitude data and the phase data stored in the memory.

The present invention further provides a vibration gyro comprising: a sense mass fixed to a substrate by means of a second supporting element and configured to be rotatably excited about an axis perpendicular to a plane by a Coriolis force generated by an angular velocity; drive masses on right and left sides, each drive mass being suspended inside the sense mass by means of a first supporting element so that each drive mass may be driven and vibrated in one direction parallel to the plane, wherein the drive masses are connected to each other by means of a connecting spring having elasticity in a direction of driving-vibration of the drive masses so that the drive masses represent an anti-phase vibration mode wherein the drive masses are vibrated at opposite phases, wherein the sense mass is configured not to excited in the direction of the driving-vibration due to the driving-vibration of the drive masses, and wherein the vibration gyro further comprises a correction electrode positioned adjacent to the drive mass, the correction electrode being configured to generate an electrostatic force by a DC voltage applied to the correction electrode when an angular velocity is not input, in order to cancel a rotational torque applied to the sense mass due to the driving-vibration of the drive masses.

In a preferred embodiment, the correction electrode has a pair of combs extending in opposed directions in relation to the direction of driving-vibration of the drive masses, and the drive masses have comb structures which are opposed to the respective combs of the correction electrode.

In a preferred embodiment, the correction electrode is arranged within each drive mass and is fixed close to a portion of each drive mass which is the farthest from a rotational center of the sense mass.

In a preferred embodiment, the vibration gyro further comprises: a memory which stores DC voltage data for limiting a quadrature error or an orthogonal bias value of the vibration gyro, the data being associated with an operating temperature of the vibration gyro; and a temperature sensor which measures a temperature of the vibration gyro, wherein the vibration gyro further comprises a correction signal adjusting part which generates a correction signal for adjusting an amplitude of an DC control voltage applied to the correction electrode, based on a measured value of the temperature sensor and the DC voltage data stored in the memory.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
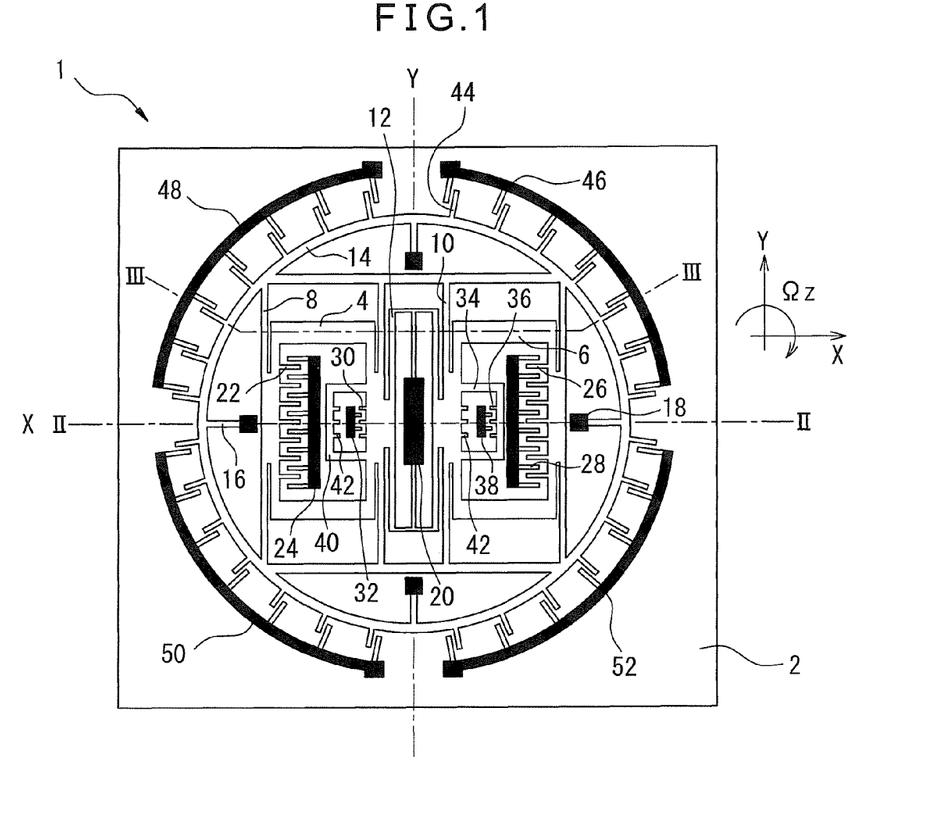
FIG. 1 is a plane view of a vibration gyro according to a first embodiment of the present invention.
Figure 2:
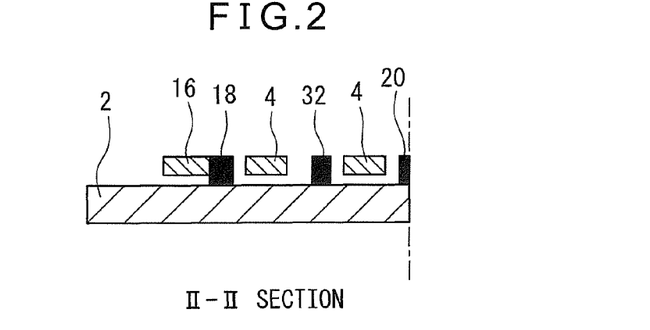
FIG. 2 is a cross-sectional view of the gyro along a II-II line of FIG. 1.

FIG. 1 is a plane view showing a basic configuration of a vibration gyro 1 according to a first embodiment of the present invention, and FIGS. 2 and 3 are cross-sectional view along II-II and lines of FIG. 1, respectively.

In each drawing, reference numeral 2 represents a substrate constituted by an insulating material such as glass, and other structural components of vibration gyro 1 are made from monocrystalline silicon. In vibration gyro 1 of FIG. 1, drive masses 4 and 6, made from monocrystalline silicon, positioned on left and right sides (in this case, drive mass 4 is positioned on the left side) are supported by at least one (four in the embodiment) drive supporting element 8 and at least one (four in the embodiment) drive supporting element 10, respectively, the supporting elements extending in a Y-direction. Drive supporting elements 8 and 10 are configured so that the rigidity thereof in a drive direction (an X-direction) or a horizontal direction parallel to a surface of substrate 2 is lower than the rigidity thereof in the other direction, whereby drive masses 4 and 6 are movable in the X-direction. Drive masses 4 and 6 are connected by a center connecting spring 12 or an elastic connecting element.

The other ends of drive supporting elements 8 and 10, which are not connected to drive masses 4 and 6, respectively, are connected to a generally ring-shaped sense mass 14 which is arranged so as to surround drive masses 4 and 6. Sense mass 14 is supported by at least one (four in the embodiment) sense supporting element 16, and the other end of sense supporting element 16 is connected to a peripheral anchor 18 bonded to substrate 2. In the drawings, a black out section corresponds to a portion fixed to substrate 2, and the other section (a white or outlined section) corresponds to a portion which is movable or not fixed to the substrate.

Sense supporting element 16, which supports sense mass 14, is configured so that the rigidity of the element in rotational motion with respect to the Z-axis perpendicular to the surface of substrate 2 is lower than the rigidity thereof in the other direction axis, whereby sense mass 14 is rotatably vibrated about the Z-axis. In this case, center connecting spring 12 includes left, middle and right elements, and the middle element is connected to a center anchor 20 fixed to the center of substrate 2. By connecting the middle element of connecting spring 12 to center anchor 20, a resonant mode frequency in the Z-direction may be improved, whereby an unnecessary displacement in the Z-direction due to external force may be limited. As shown in the cross-sectional views of FIGS. 2 and 3, drive masses 4 and 6, drive supporting elements 8 and 10, center connecting element 12, sense mass 14, and sense supporting element 16 are opposed to substrate 2 with a predetermined gap therebetween.

As shown in FIG. 1, drive mass 4 on the left side is a generally rectangular frame member, and has a comb electrode 22 extending from an outer side (away from the center) of the frame to a center side of the frame. Opposed to comb electrode 22, a left drive fixed comb electrode 24 is fixed to substrate 2, whereby left drive mass 4 can be driven and vibrated in the left-right direction (or the X-direction). Similarly, drive mass 6 on the right side is a generally rectangular frame member, and has a comb electrode 26 extending from an outer side (away from the center) of the frame to a center side of the frame. Opposed to comb electrode 26, a right drive fixed comb electrode 28 is fixed to substrate 2, whereby right drive mass 6 can be driven and vibrated in the left-right direction (or the X-direction).

Left drive mass 4 has a comb electrode 30 extending from the center side to the opposing side thereof, and opposed to comb electrode 30, a left drive monitor fixed comb electrode 32 is fixed to substrate 2, whereby an amount of displacement of left drive mass 4 can be measured. Further, right drive mass 6 has a comb electrode 36 extending to the center side from to the opposing side of a frame 34 arranged at the center side of right drive mass 6, and opposed to comb electrode 36, a right drive monitor fixed comb electrode 38 is fixed to substrate 2, whereby an amount of displacement of right drive mass 6 can be measured.

When an angular velocity about the Z-direction is applied to vibration gyro 1, the drive masses on the left and right sides are rotatably vibrated as well as sense mass 14. Therefore, comb electrodes 30 and 36 arranged at the drive masses are also rotatably displaced, and then the positional relationships between comb electrodes 30 and 36 and drive monitor fixed comb electrodes 32 and 38, respectively, are varied. As a result, a capacitance between the opposing electrodes is changed, whereby a monitor output may be affected. Therefore, it is preferable that the monitoring mechanism for the drive masses (i.e., comb electrodes 30, 32, 36 and 38) be positioned as close to the (rotational) center of sense mass 14 as possible.

Apparent from FIG. 1, the monitoring mechanism of left drive mass 4 (i.e., comb electrodes 30 and 32) and the monitoring mechanism of right drive mass 6 (i.e., comb electrodes 36 and 38) are not symmetrical with respect to the Y-axis. This is intended to constitute the left and right monitoring mechanisms as a so-called differential structure. Concretely, when the left and right drive masses are moved toward the center, the gap between opposing comb electrodes in the left monitoring mechanism becomes larger, and the gap between opposing comb electrodes in the right monitoring mechanism becomes smaller. In case that a drive AC voltage is applied to fixed comb electrodes 24 and 28, unnecessary monitor output may occur due to a coupling current which flows in the monitor comb electrode by a surrounding stray capacitance. However, the above differential structure may eliminate or reduce the effect of the coupling current.

Due to the asymmetry of the left and right monitor electrodes as described above, moments of the left and right drive masses are different. Then, as shown in FIG. 1, it is preferable that left drive mass 4 has a frame 40 symmetrical to frame 34, and has a dummy comb electrode 42, so that the left and right drive masses are symmetrical.

As shown in FIG. 1, sense mass 14 has a comb electrode 44 which radially and outwardly extends, and sense monitor fixed comb electrodes 46 and 48, which are opposed to comb electrode 44, are fixed to substrate 2. In detail, in a first quadrant of the X-Y plane (a right-upper area in FIG. 1), sense monitor fixed comb electrode 46 is fixed opposed to a part of comb electrode 44 in the first quadrant, and in a second quadrant of the X-Y plane (a left-upper area in FIG. 1), sense monitor fixed comb electrode 48 is fixed opposed to a part of comb electrode 44 in the second quadrant. Further, sense monitor fixed comb electrodes 46 and 48 constitute a differential mechanism. Concretely, when sense mass 14 rotates clockwise about the Z-axis, a gap between the opposing electrodes in the first quadrant becomes larger, and a gap between the opposing electrodes in the second quadrant becomes smaller. By virtue of such a mechanism, a common mode noise can be canceled, whereby more accurate measurement may be carried out.

In third and fourth quadrants of the X-Y plane (left-lower and right-lower areas in FIG. 1), first and second correction comb electrodes 50 and 52, which are opposed to comb electrode 44 of sense mass 14, respectively, are fixed to substrate 2. Although the shape of the correction comb electrode may be the same as the sense monitor fixed comb electrode as described above, the function of the correction electrode is to cancel the quadrature error (or quadrature displacement), as described below.

The vibration gyro as described above may be manufactured by using a micromachining process as follows.

First, a silicon plate is processed by dry etching using an RIE (Reactive Ion Etching) facility, etc., so that a predetermined gap (see FIGS. 2 and 3) is formed between glass substrate 2 and the movable components of the gyro. In this regard, on an area of the silicon plate not to be dry-etched, i.e., other than a portion of the silicon which will become the gap, a resist mask is formed by using a semiconductor photolithography technique, etc.

Next, the glass substrate and the silicon plate are bonded by anodic bonding technique, etc. In this step, the silicon plate is polished so that the silicon plate has a predetermined thickness, and selective spattering of conductive metals, such as Cr & Au, is carried out on an area which is to be a bonding pad, whereby an electrode pad (not shown) is formed.

Further, on the surface (polished surface) of the bonded silicon plate, a resist pattern as shown in the plane view of FIG. 1 is formed by means of a mask material such as a photoresist, by utilizing photolithography technique. Also, an area of the silicon plate not to be dry-etched is protected by a resist mask.

Then, through-etching is carried out in the thickness direction of the silicon plate, by dry etching using the RIE facility, etc. A basic structure of the vibration gyro can be manufactured in the manufacturing process using the micromachining technique as described above.

As such, necessary materials for manufacturing the gyro are the silicon plate and the glass substrate only. By using the glass material having the generally same linear expansion coefficient as the silicon plate, structural strain (thermal strain) and/or stress (thermal stress) due to change in temperature is not likely to occur, whereby there is provided a vibration gyro which is structurally stable and has excellent property.

Next, the function of the vibration gyro will be explained. For example, when the sense mass having mass M is vibrated with velocity Vx in the X-direction, an absolute value of Coriolis force Fy in the Y-direction, which is generated when the sense mass is rotated (at rotational angular velocity Ωz), is represented as following.

$$Fy=2\Omega z \cdot M \cdot Vx$$

Therefore, in the vibration gyro for determining the angular velocity by detecting the displacement of the sense mass due to Coriolis force Fy, it is necessary to vibrate the drive mass with velocity Vx. As the method therefor, a comb drive method using an electrostatic force may be used.

When a summation of DC voltage $V_{DC}$ and AC voltage $V_{AC}$ is applied between left drive mass 4 and left drive comb electrode 24, and between right drive mass 6 and right drive comb electrode 28, a driving force, having the same voltage cycle as $V_{AC}$, is generated. On the other hand, since left drive mass 4 and right drive mass 6 are connected to each other by elastic connecting spring 12, the drive masses represent anti-phase vibration mode wherein the drive masses move close to and away from each other. Therefore, by vibrating the drive masses while the frequency of $V_{AC}$ coincides with the resonant frequency of the anti-phase vibration mode, drive masses 4 and 6 represent the anti-phase vibration wherein the drive masses move close to and away from each other. Velocity Vx of this vibration is detected as change in electrostatic capacitance via an electric circuit, by means of left and right monitor comb electrodes 32 and 38, and the detected velocity is used for AGC (auto gain control) for keeping the amplitude of the driving-vibration constant.

During left and right drive masses 4 and 6 are vibrated in the X-direction at the opposite phases, when angular velocity Ωz about the direction perpendicular to the plane of FIG. 1 (the Z-direction) is input, Coriolis force Fy in the Y-direction at the opposite phases is applied to the left and right drive masses. Due to the Coriolis force, a rotational torque about the Z-axis is applied to sense mass 14, and sense mass 14 is rotationally vibrated about the Z-axis. As a result, the electrostatic capacitance between comb electrode 44 arranged on sense mass 14 and first and second sense fixed comb electrodes 46 and 48 is varied in differential manner. By electrically reading the differential variation of the capacitance and processing the variation by means of a phase sensitive demodulator circuit as described below, angular velocity Ωz may be detected.

The vibration gyro of FIG. 1 is different from the configurations as described in JPP'344, in that the amplitude of the vibration of the sense mass is not similar to the driving-vibration of the left and right drive masses. In detail, in JPP'344, the second resonator (corresponding to the sense mass) is displaced similarly to the first resonator (corresponding to the drive mass), due to the driving-vibration of the first resonator. Further, the sense mass is opposed to the fixed electrode while forming a narrow gap therebetween, in order to constitute the electrostatic capacitance for detection. In such a configuration, due to an error in manufacturing process of the gyro (in particular, an error in silicon etching), the narrow gap may be significantly varied, and a quadrature error (leakage output) is generated due to change in the capacitance by the driving-vibration, as well as due to the difference between resonant frequencies of the left and right sense masses. On the other hand, in the embodiment of the invention, since the sensing-vibration is substantially independent or separated from the driving-vibration, the leakage output when the angular velocity is not input may be significantly reduced, and a bias value and the variation thereof due to the leakage output may be limited.

In the first embodiment, the quadrature error due to the factors regarding the prior art may be significantly limited. However, due to production tolerance of each component, the vibration direction of left and right drive masses 4 and 6 and/or the direction of the generated driving force may be slightly offset from the X-direction. When this offset occurs in the X-Y plane, a torque for rotationally vibrating sense mass 14 is generated, whereby the quadrature error is generated. In order to apply a counter torque to sense mass 14 for canceling this rotational torque, the present invention utilizes first and second correction comb electrodes 50 and 52 as described above.

In detail, by applying AC voltage to first and second correction comb electrodes 50 and 52 so as to generate an electrostatic (attractive) force, the leakage rotational displacement of sense mass 14, which is generated when the input angular velocity is zero, may be canceled. In the embodiment as shown in FIG. 1, the correction comb electrodes are positioned in third and fourth quadrants (left-lower and right-lower areas), respectively. The positional relationship between the correction comb electrodes and the comb of the sense mass is determined so that a torque in the counter-clockwise direction is generated in the third quadrant and a torque in the clockwise direction is generated in the fourth quadrant, when the AC voltage is applied to the correction comb electrodes. By virtue of this, the fluctuation of the rotational displacement of the sense mass may be effectively limited in both directions.

Figure 4:
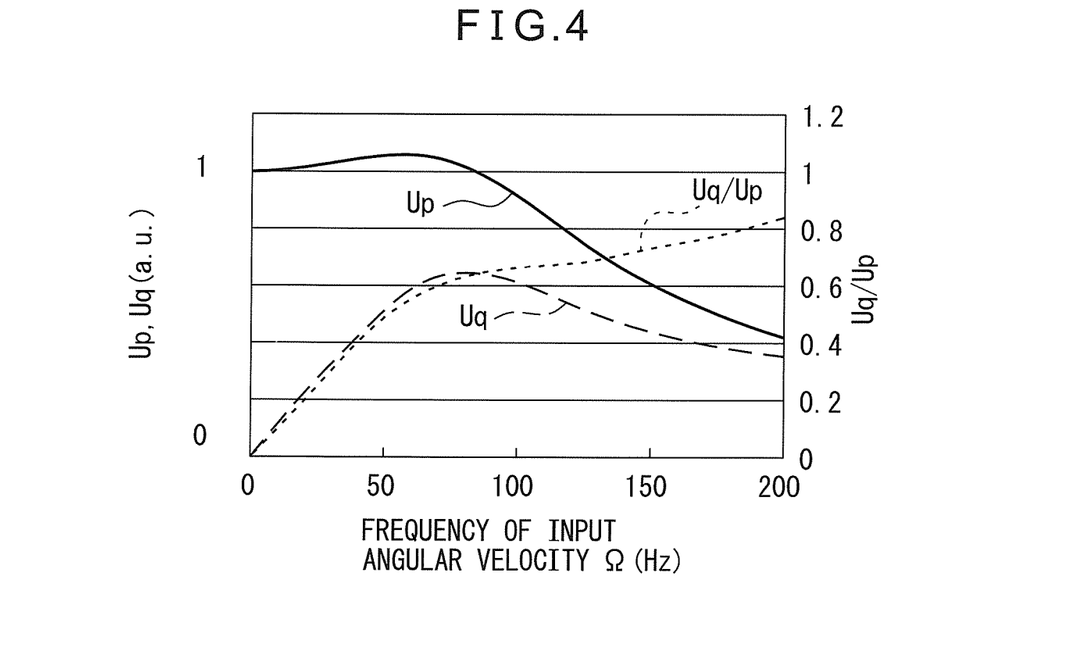
FIG. 4 shows a graph wherein a vertical axis represents a sense displacement, a displacement detected at a phase orthogonal to the sense displacement and a ratio of the displacements in an arbitrary unit, and a horizontal axis represents the frequency of the input angular velocity.

FIG. 4 shows a graph wherein a vertical axis represents a sense displacement Up, a displacement detected Uq (or an orthogonal bias component) detected at a phase orthogonal to the sense displacement Up, and a ratio Uq/Up in an arbitrary unit (a.u.); and a horizontal axis represents the frequency of the input angular velocity Ω, when a difference Δf between anti-phase frequency fx of the drive system and resonant frequency fr is equal to 75 Hz. In other words, FIG. 4 shows a result of a simulation of frequency dependency of Up, Uq, and Uq/Up. As shown in FIG. 4, since Uq and Uq/Up are not equal to zero when the angular frequency is not zero, the method of JPP'344 for determining the amount of correction with reference to value Bq value (or the orthogonal bias component) may generate a correction error. Therefore, the correction of the quadrature error with reference to the orthogonal bias during actual operation of the gyroscope is inappropriate, and it is appropriate to minimize the orthogonal bias component when angular velocity Ω is equal to zero.

On the other hand, in order to cancel the generated quadrature error (displacement vibration) in relation to AC control voltage applied to correction electrodes 50 and 52, it is necessary to apply an anti-phase torque having the same amplitude, to the generated torque.

Figure 5:
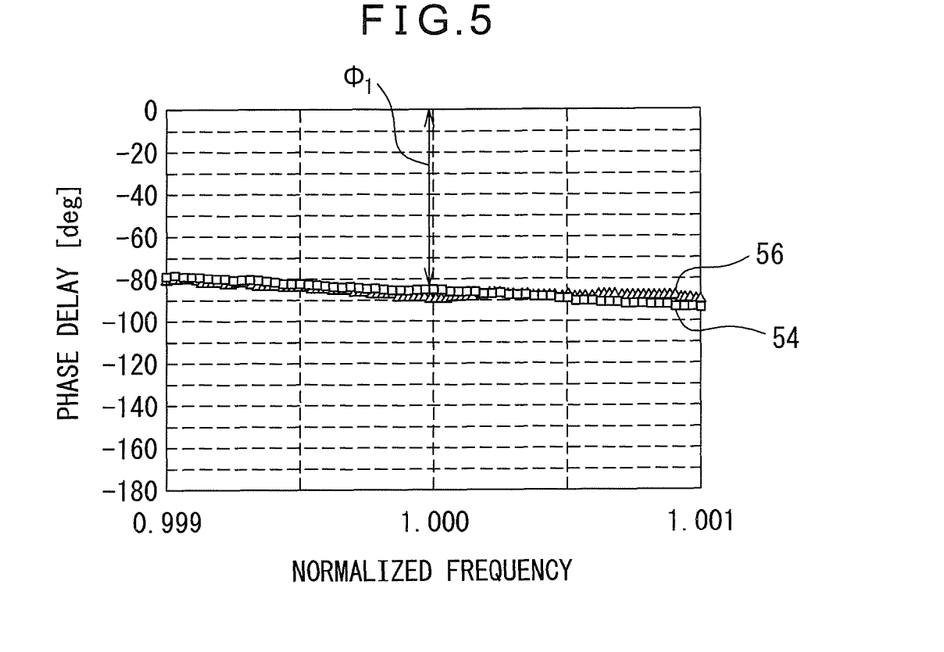
FIG. 5 is a graph showing a measurement result of a frequency characteristic of a phase of a quadrature error generated by a drive displacement, and a measurement result of a frequency characteristic of a phase of the sense displacement when an electrostatic force is directly applied to a sense electrode, in the gyro of FIG. 1.

FIG. 5 is a graph showing a measurement result 54 (plotted by square symbols) of a frequency characteristic (based on the drive displacement) of a phase of a quadrature error (displacement vibration in the sensing direction) generated by a drive displacement; and a measurement result 56 (plotted by triangular symbols) of a frequency characteristic (based on the driving electrostatic force) of a phase of the sense displacement when an electrostatic force is directly applied to the sense electrode, in the gyro of FIG. 1. As shown in FIG. 5, the phase delay of the response displacement of the detection system relative to the drive displacement (graph 54) and the phase delay of the response displacement of the detection system due to the direct excitation of the detected vibration (graph 56) generally coincide with each other. In other words, the excited vibration (or the quadrature error) of the detection system is generated due to the in-phase torque to the drive displacement vibration.

FIG. 5 indicates that the difference between anti-phase frequency fx of the drive system and resonant frequency fr is within several Hz (i.e., fx≈fr) and phase delay Φ is approximately 90 degrees. However, the inventor found that a similar result may be obtained even if the two frequencies are considerably different from each other, and that the generated torque is maximum at the maximum point of the drive vibration displacement. Therefore, in order to properly correct the quadrature error, it is preferable to use a monitor signal phase of the drive displacement.

Figure 6:
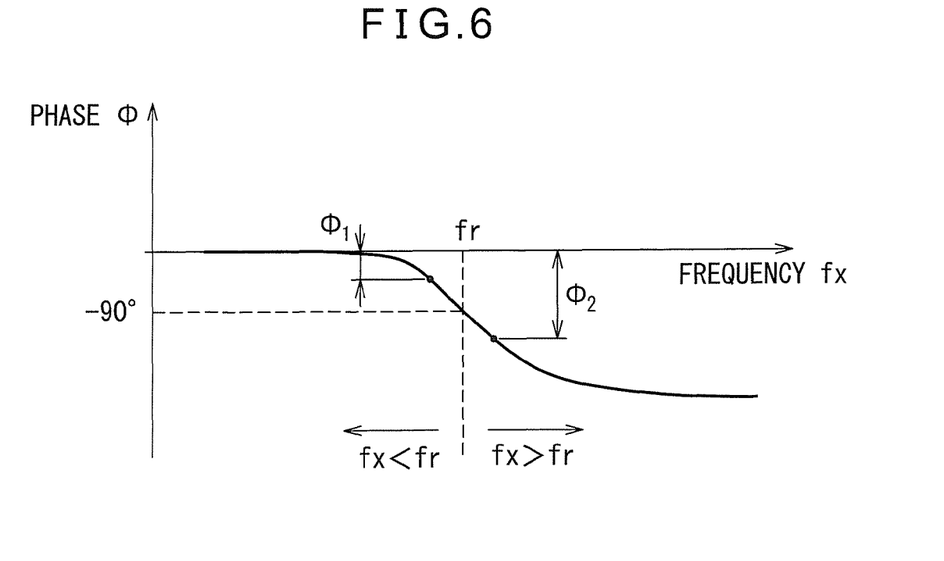
FIG. 6 is a graph supplementary explaining FIG. 5 and showing a phase delay of the sense displacement relative to a drive velocity phase.

FIG. 6 is a graph supplementary explaining the above, showing phase delay Φ of the sense displacement (i.e., the phase of the sense displacement when the drive velocity phase is equal to zero), relative to a drive velocity phase (or the phase of the Coriolis force). As shown in FIG. 6, phase delay Φ varies depending on the magnitude relationship between drive vibration frequency fx and detection resonant frequency fr. In detail, $\Phi=\Phi_1<90°$ is true when fx<fr, and $\Phi=\Phi_2>90°$ is true when fx>fr. In addition, since there is an offset of 90 degrees between the phase of the monitor signal of the drive displacement and the phase of the drive velocity, the phase of the quadrature error is offset by 90 degrees from detection displacement depending on the Coriolis force, even if frequencies fx and fr are different from each other.

Figure 7:
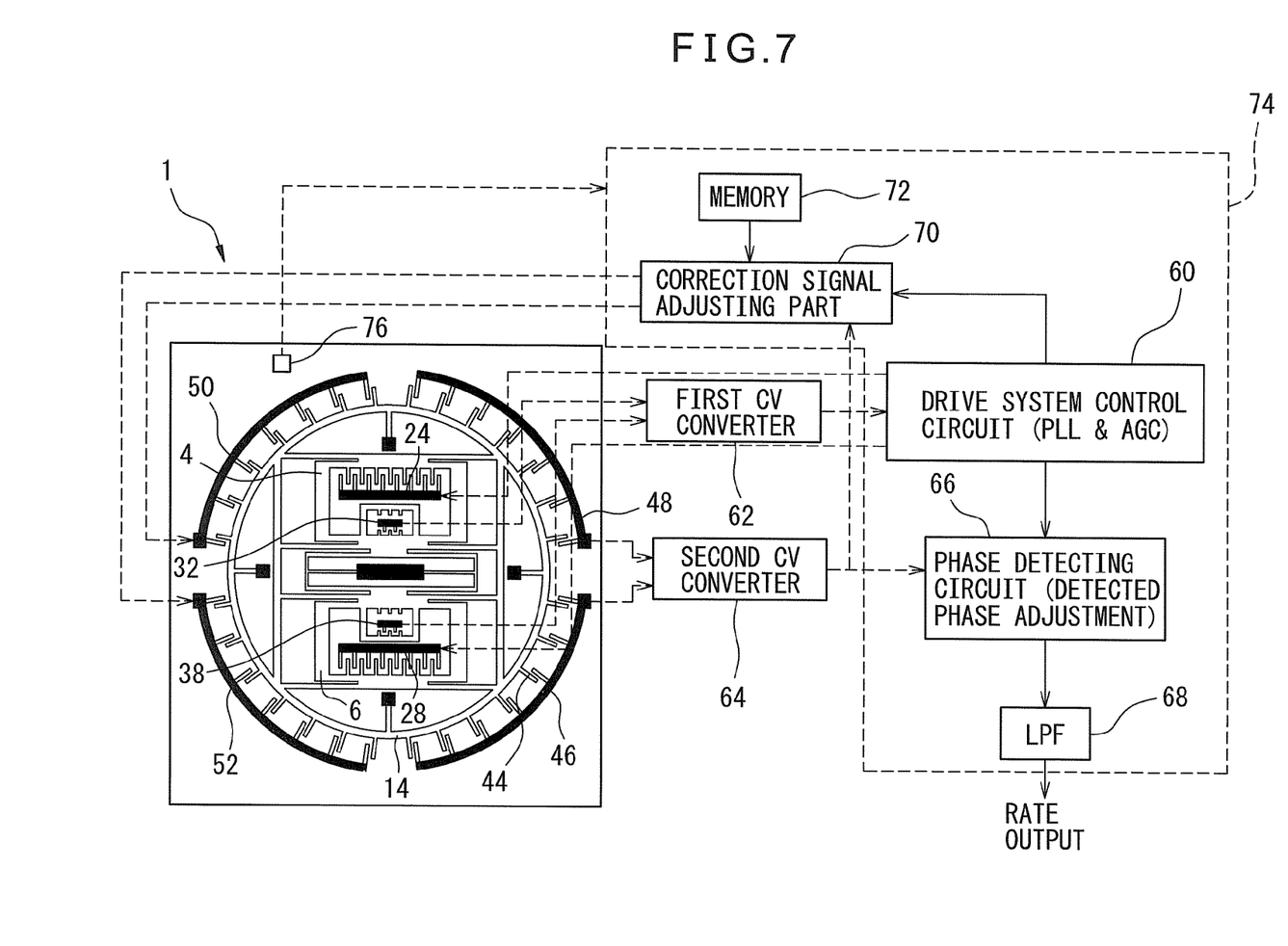
FIG. 7 is a block diagram showing a feedback system circuit for limiting rotational vibration of a sense system used in the gyro of FIG. 1.

FIG. 7 is a block diagram showing a feedback system circuit for limiting rotational vibration of the sense system, which is capable of being applied to the vibration gyro of FIG. 1. A signal is input to a digital control system via an analogue/digital converter (ADC) (not shown). A drive system control circuit (PLL (phase locked loop) & AGC) 60 is associated with drive comb electrodes 24 and 28, and a first CV converter 62 is associated with monitor fixed comb electrodes 32 and 38. By means of drive system control circuit 60 and first CV converter 62, drive masses 4 and 6 are controlled and driven at predetermined anti-phase frequency and amplitude. The change in the capacitance between comb electrode 44 and sense monitor fixed comb electrodes 46 and 48, due to the rotational displacement of sense mass 14, is converted into a voltage by a second CV converter 64. Then, the phase of the capacitance change is detected (or adjusted) by a phase detecting section (a phase sensitive demodulator circuit in the embodiment) 66 at a phase of the drive vibrational frequency in the sense system response. A bandwidth of an output after this phase detection is limited by a low-pass filter 68, and then is output as an angular velocity signal (or a rate). In such a way, the output corresponding to angular velocity Ω may be obtained.

The information, which is transmitted from monitor fixed comb electrodes 32 and 38 to drive system control circuit 60, is transmitted to a correction signal adjusting part 70 as a drive displacement signal. Correction signal adjusting part 70 adjusts the drive displacement signal based on the phase of the monitor output of the driving-vibration, and an AC control voltage applied to correction electrodes 50 and 52 is determined based on the adjusted drive displacement signal (or the correction signal). Due to the manufacturing tolerances or the unbalance of the driving force, even when angular velocity Ω is zero, second CV converter 64 may generate a certain output and then a bias value may be output as a rate output, which corresponds to the quadrature error as described above. However, the amplitude of the AC control voltage can be properly adjusted by the correction signal from correction signal adjusting part 70, and thus the quadrature error may be limited. In addition, drive system control circuit 60, phase detecting circuit 66, LPF 68, correction signal adjusting part (or the adjustment circuit) 70 and a memory 72 (as described below) may be constituted as a digital control circuit 74.

The quadrature error or the orthogonal bias value has temperature dependency, and thus it is effective that correction signal adjusting part 70 output the correction signal corresponding to the operating temperature of the gyro. Hereinafter, a concrete example thereof will be explained.

First, at each preset temperature, the AC control voltage to be applied to correction electrodes 50 and 52 is determined by using the phase of the drive displacement signal when angular velocity Ω is zero. Then, the amplitude of the AC control voltage for minimizing the output (or the bias value) of second CV converter 64 is determined. In this regard, the "preset temperature" means some representative temperature values within the operating temperature of the gyro (for example, from −45 to 85 degrees C. at intervals of 5 degrees C.). Data of the amplitude of the AC control voltage, determined in such a way, is stored in memory (storage media) 72 in a proper format such as a data map or a data table. In addition, the data may be determined experimentally or computationally.

On the other hand, gyro 1 has a temperature sensor 76 for measuring the actual temperature (or the operating temperature) of the gyro. Then, correction signal adjusting part 70 generates a correction signal required to adjust the amplitude of the AC control voltage applied to the correction electrodes, based on an output (measured temperature) of temperature sensor 76 and the data corresponding to the measured temperature stored in memory 72. Based on the generated correction signal, the amplitude of the AC control voltage applied to the correction electrodes is adjusted.

It is preferable that temperature sensor 76 directly measure the temperature of the vibration gyro. For example, a thermistor element or a thermocouple adhered and fixed to substrate 2 may be used as temperature sensor 76. In this case, an amplifier for converting a resistance of the thermistor element into a voltage and/or an AD converter (not shown) for A/D converting the converted voltage or a voltage of the thermocouple are used, and temperature information is input to digital control circuit 74 (or memory 72). The input temperature information is used as information for correcting the quadrature error within the operating temperature of the gyro.

Figure 8:
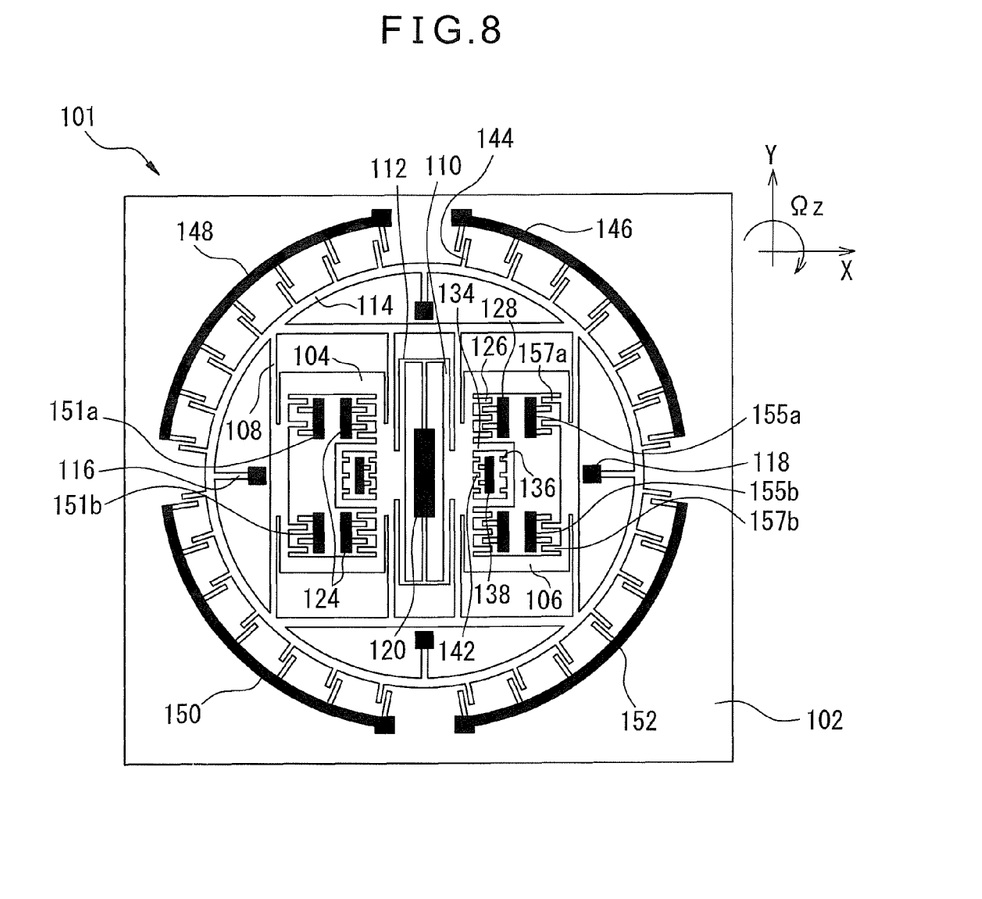
FIG. 8 is a plane view of a vibration gyro according to a second embodiment of the present invention.
Figure 9:
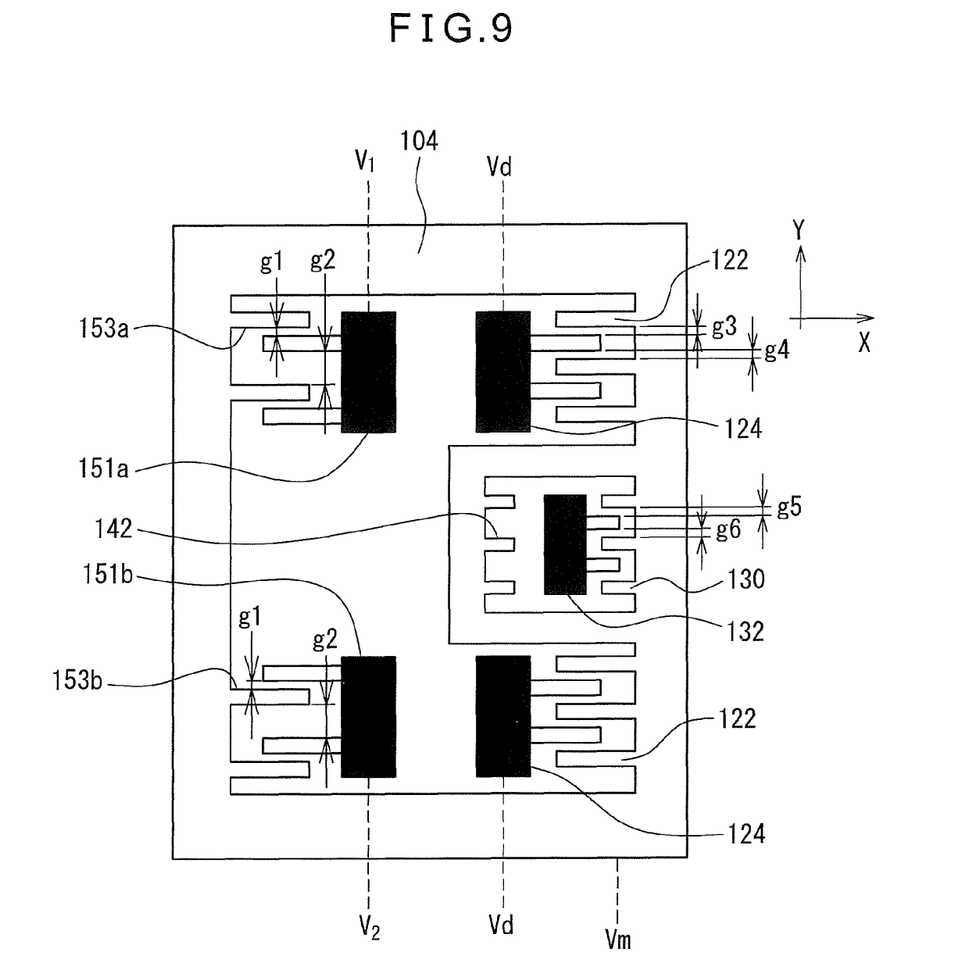
FIG. 9 is a plane view showing the detail of a correction electrode within a drive mass on the left side of the gyro of FIG. 8.

FIG. 8 is a plane view showing a basic configuration of a vibration gyro 101 according to a second embodiment of the present invention, and FIG. 9 is a plane view showing a detail of a correction electrode within left drive mass 104 of gyro 101. The second embodiment is similar to the first embodiment except for inside structures of left and right drive masses. Therefore, in the second embodiment, like reference numerals in the series 100 are used to indicate components corresponding to respective components of the first embodiment, and the detailed explanation thereof is omitted.

In addition, comb electrodes 150 and 152 are structurally similar to correction comb electrodes 50 and 52 in the first embodiment. However, comb electrodes 150 and 152 are not necessary, since comb electrodes 151a, 151b, 155a and 155b are used as correction electrodes in the second embodiment. Alternatively, comb electrodes 150 and 152 may function as sense monitor fixed comb electrodes 146 and 148, in other words, may be used as the sense monitor fixed comb electrodes. In this case, an initial sense monitor capacitance may be doubled by using sense monitor fixed comb electrodes 146, 148, 150 and 152, whereby detection sensitivity may also be doubled.

The occurrence of the quadrature error in the second embodiment is the same as in the first embodiment. In other words, due to production tolerance, the vibration direction of the left and right drive masses and/or the direction of the generated driving force may be slightly offset from the X-direction. When this offset occurs in the X-Y plane, a torque for rotationally vibrating the sense mass is generated, whereby the quadrature error is generated.

Thus, in the second embodiment, in order to apply a counter torque to the sense mass for canceling the generated torque, left correction comb electrodes 151a and 151b are fixed to substrate 102 adjacent to left drive mass 104 (in the illustrated embodiment, near an inner portion of frame-like drive mass 104), and comb electrodes 153a and 153b opposed to correction comb electrodes 151a and 151b, respectively, are arranged on the inner portion of the frame member which constitutes left drive mass 104. Similarly, right correction comb electrodes 155a and 155b are fixed to substrate 102 adjacent to right drive mass 106 (in the illustrated embodiment, near an inner portion of frame-like drive mass 106), and comb electrodes 157a and 157b opposed to correction comb electrodes 155a and 155b, respectively, are arranged on the inner portion of the frame member which constitutes right drive mass 106. In the second embodiment, in order to generate an electrostatic (attractive) force for canceling the leakage rotational displacement of the sense mass 14, which is generated when the input angular velocity is zero, DC voltage is applied to the correction comb electrodes, as explained below.

Usually, as indicated by gaps g3 and g4 in FIG. 9, the gaps between drive fixed comb electrode 124 and comb electrode 122 arranged on the drive mass are equalized each other (g3=g4). However, when there is a difference between g3 and g4 due to production tolerance, the electrostatic force in the Y-direction (in the vertical direction in FIG. 9) at the smaller gap side is larger than the larger gap side, whereby driving force is generated not only in the X-direction but also in the Y-direction. When the directions of the driving forces in the left and right drive masses in the Y-direction are opposite (+Y-direction and −Y-direction), or when the magnitudes of the driving forces in the left and right drive masses in the Y-direction are different, a torque for rotating sense mass 114 is generated.

Then, as indicated by gaps g1 and g2 in FIG. 9, the comb electrodes are configured so that the gap between left correction comb electrode 151a and opposed comb electrode 153a, and the gap between left correction comb electrode 151b and opposed comb electrode 153b, are different from each other (in the illustrated embodiment, g1<g2). By virtue of this, when voltages $V_1$ and Vm are applied to left correction comb electrode 151a and left drive mass 104, respectively, a force in the −Y-direction is applied to left drive mass 104 due to the DC voltage difference ($V_1$−Vm). On the other hand, when voltages $V_2$ and Vm are applied to left correction comb electrode 151b (positioned at the −Y direction side relative to correction comb electrode 151a) and left drive mass 104, respectively, a force in the +Y-direction is applied to left drive mass 104 due to the DC voltage difference ($V_2$−Vm).

By adjusting both the DC voltage differences (in other words, $V_1$ and $V_2$) corresponding to the direction of the quadrature displacement, a correction torque, for canceling the rotational torque (i.e., the cause of the quadrature displacement) due to the electrostatic force in the Y-direction generated at drive comb electrode 124, may be generated. The above configuration is also applicable to right correction comb electrodes 155a and 155b. Therefore, by adjusting the DC voltage difference between each correction electrode and the drive mass with respect to the four correction electrodes, the quadrature error can be effectively canceled. Further, in relation to the phase of the correction torque, an overlapping area between each correction comb electrode and the opposed comb electrode of the drive mass is increased or decreased in phase with the drive displacement of the drive mass, whereby the electrostatic force corresponding to the overlapping area is generated at the drive frequency. Therefore, in the second embodiment, unlike the first embodiment, it is not necessary to adjust the phase of the correction torque.

Since the force in the Y-direction generated by drive comb electrodes 124 and 128 applies the rotational torque to the drive mass, the torque (and thus the quadrature rotational displacement) becomes larger as the difference between the rotational center and the positions of drive comb electrodes 124 and 128 (i.e., the position where the force in the Y-direction is generated) is increased. In other words, it is preferable that drive comb electrodes 124 and 128 be close to the rotational center as possible, and as shown in FIGS. 8 and 9, the electrodes are positioned near the center within the drive mass. On the other hand, it is preferable that correction comb electrodes 151a, 151b, 155a and 155b generate larger correction torque by lower DC voltage, and thus the correction comb electrodes are positioned within the drive mass and away from the rotational center as possible.

Figure 10:
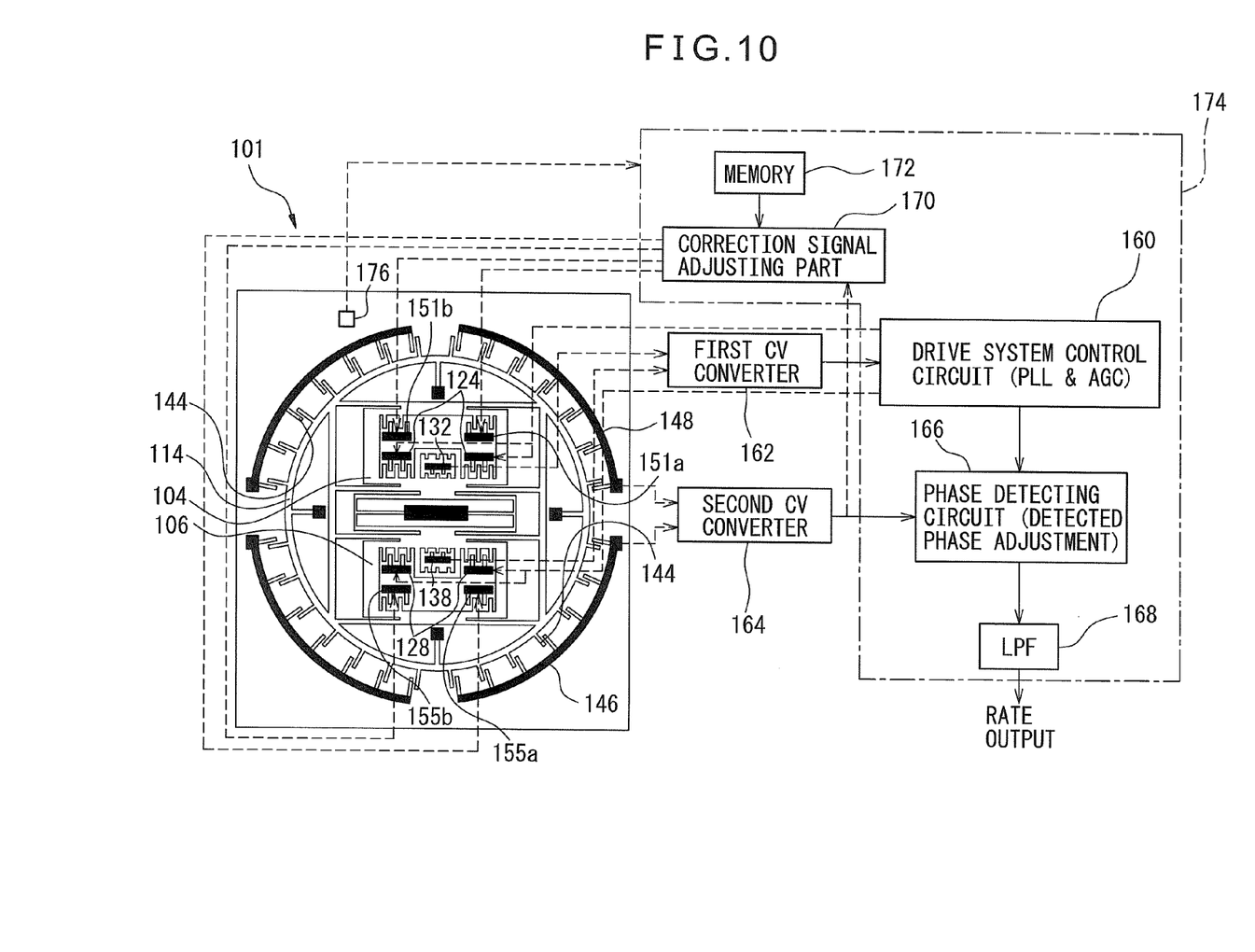
FIG. 10 is a block diagram showing a feedback system circuit for limiting rotational vibration of a sense system used in the gyro of FIG. 8.

FIG. 10 is a block diagram showing a feedback system circuit for limiting rotational vibration of the sense system, which is capable of being applied to the vibration gyro of FIG. 8. A signal is input to a digital control system via an analogue/ digital converter (ADC) (not shown). A drive system control circuit (PLL (phase locked loop) & AGC) 160 is associated with drive comb electrodes 124 and 128, and a first CV converter 162 is associated with monitor fixed comb electrodes 132 and 138. By means of drive system control circuit 160 and first CV converter 162, drive masses 104 and 106 are controlled and driven at predetermined anti-phase frequency and amplitude. The change in the capacitance between comb electrode 144 and sense monitor fixed comb electrodes 146 and 148, due to the rotational displacement of sense mass 114, is converted into a voltage by a second CV converter 164. Then, the phase of the capacitance change is detected (or adjusted) by a phase detecting section (a phase sensitive demodulator circuit in the embodiment) 166 at a phase of the drive vibrational frequency in the sense system response. A bandwidth of an output after this phase detection is limited by a low-pass filter 168, and then is output as an angular velocity signal (or a rate). In such a way, the output corresponding to angular velocity Ω may be obtained.

The information, which is transmitted from monitor fixed comb electrodes 132 and 138 to drive system control circuit 160, is transmitted to a correction signal adjusting part 170 as a drive displacement signal. Correction signal adjusting part 170 adjusts the drive displacement signal based on the phase of the monitor output of the driving-vibration, and an DC control voltage applied to correction electrodes 151*a*, 151*b*, 155*a* and 155*b* is determined based on the adjusted drive displacement signal (or the correction signal). Due to the manufacturing tolerances or the unbalance of the driving force, even when angular velocity Ω is zero, second CV converter 164 may generate a certain output and then a bias value may be output as a rate output, which corresponds to the quadrature error as described above. However, the amplitude of the DC control voltage can be properly adjusted by the correction signal from correction signal adjusting part 170, and thus the quadrature error may be limited. In addition, drive system control circuit 160, phase detecting circuit 166, LPF 168, correction signal adjusting part'(or the adjustment circuit) 170 and a memory 172 (as described below) may be constituted as a digital control circuit 174.

The quadrature error or the orthogonal bias value has temperature dependency, and thus it is effective that correction signal adjusting part 170 output the correction signal corresponding to the operating temperature of the gyro. Hereinafter, a concrete example therefor will be explained.

First, at each preset temperature, the DC control voltage to be applied to correction electrodes 151*a*, 151*b*, 155*a* and 155*b* is determined by using the phase of the drive displacement signal when angular velocity Ω is zero. Then, the amplitude of the DC control voltage for minimizing the output (or the bias value) of second CV converter 164 is determined. In this regard, the "preset temperature" means some representative temperature values within the operating temperature of the gyro (for example, from −45 to 85 degrees C. at intervals of 5 degrees C.). Data of the amplitude of the AC control voltage, determined in such a way, is stored in memory (storage media) 172 in a proper format such as a data map or a data table. In addition, the data may be determined experimentally or computationally.

On the other hand, gyro 101 has a temperature sensor 176 for measuring the actual temperature (or the operating temperature) of the gyro. Then, correction signal adjusting part 170 generates a correction signal required to adjust the amplitude of the DC control voltage applied to the correction electrodes, based on an output (measured temperature) of temperature sensor 176 and the data corresponding to the measured temperature stored in memory 172. Based on the generated correction signal, the amplitude of the DC control voltage applied to correction electrodes 151*a*, 151*b*, 155*a* and 155*b* is adjusted.

It is preferable that temperature sensor 176 directly measure the temperature of the vibration gyro. For example, a thermistor element or a thermocouple adhered and fixed to substrate 102 may be used as temperature sensor 176. In this case, an amplifier for converting a resistance of the thermistor element into a voltage and/or an AD converter (not shown) for A/D converting the converted voltage or a voltage of the thermocouple are used, and temperature information is input to digital control circuit 174 (or memory 172). The input temperature information is used as information for correcting the quadrature error within the operating temperature of the gyro.

As described above, in the vibration gyro according to the embodiment, the sensing-vibration is substantially independent or separated from the driving-vibration. Further, the vibration gyro has the adjusting means for canceling the quadrature error generated by the structural unbalance, by applying AC voltage having the proper phase or DC voltage to the correction electrode when the angular velocity is equal to zero. Therefore, according to the present invention, the quadrature error may be adequately limited, whereby the bias stability of the gyro may be improved even in the actual operation of the gyroscope.

In the above second embodiment, as the driving force for the left and right drive masses, the drive force in the X-direction generated between the drive comb electrode and the comb electrode arranged on the drive mass. Due to the structural unbalance caused by production tolerance, etc., (e.g., shape tolerance of the drive supporting element and/or the comb electrode), force in the Y-direction is applied to the left and right drive masses, and the force generates torque which causes rotational displacement (vibration) of the sense mass. As a result, the torque generated at each drive mass is not canceled each other, whereby the leakage output (or the quadrature error) may be generated by the rotational vibration.

In this regard, in the second embodiment as shown in FIGS. 8 and 9, correction fixed comb electrodes 151*a* and 151*b* are arranged so that the force in the −Y-direction is generated due to the DC voltage difference ($V_1$−Vm) between correction fixed comb electrode 151*a* and left drive mass 104, and so that the force in the +Y-direction is generated due to the DC voltage difference ($V_2$−Vm) between correction fixed comb electrode 151*b* and left drive mass 104. Then, by adjusting the DC voltage differences, a torque, for canceling the rotational torque which causes the quadrature error (the rotational displacement) due to the electrostatic force in the Y-direction, may be generated. The same concept is also applicable to right drive mass 106.

However, in the embodiment of FIGS. 8 and 9, since the comb electrode is used as the correction electrode, the magnitude of electrostatic force F in the Y-direction depends on overlapping length L (see FIG. 9) between fixed comb electrode 151*a* and comb electrode 153*a* of the drive mass. Also, electrostatic force F depends on an amount of displacement X, since drive mass 104 is displaced in the X-direction. Concretely, in FIG. 9, generated electrostatic force F is represented by following equation (1), wherein:

$V_1$: DC potential of upper fixed electrode 151*a*
$V_2$: DC potential of lower fixed electrode 151*b*
Vm: DC potential of the movable electrode (or drive mass 104)
ε: permittivity of vacuum H: thickness (or the length in the direction perpendicular to the drawing) of the structure
X: drive displacement
g: smaller gap between the combs (e.g., g1 in FIG. 9)

$$F = \frac{\varepsilon HLVm}{g^2}(V_- - V_+) + \frac{\varepsilon HX}{2g^2}(V_+^2 - V_-^2) \quad (1)$$

As is apparent from equation (1), in the embodiment of FIG. 9, electrostatic force F is affected by both overlapping length L of the combs and drive displacement X. In particular, a first item in the right side of equation (1) (i.e., the item relating to L) significantly affects the resonant frequency of the sense system.

Figure 11:
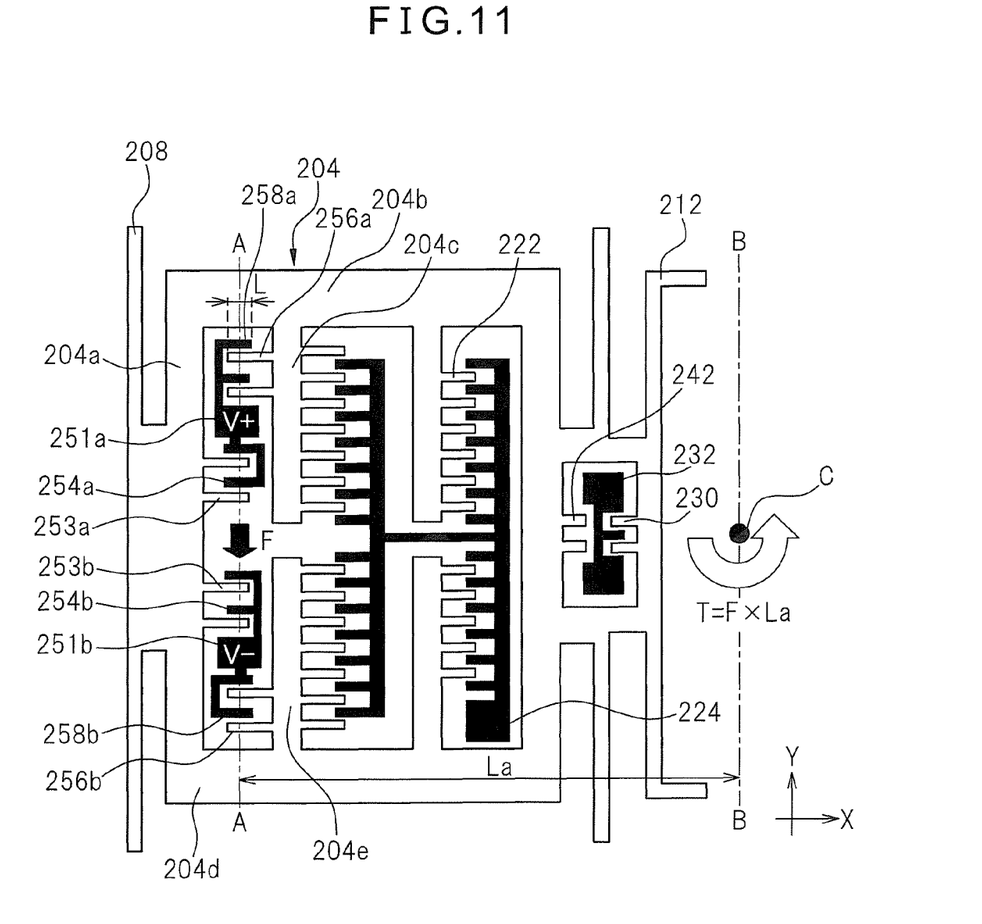
FIG. 11 is a plane view showing the detail of a correction electrode within a drive mass on the left side of a gyro according to a third embodiment of the present invention.
Figure 12:
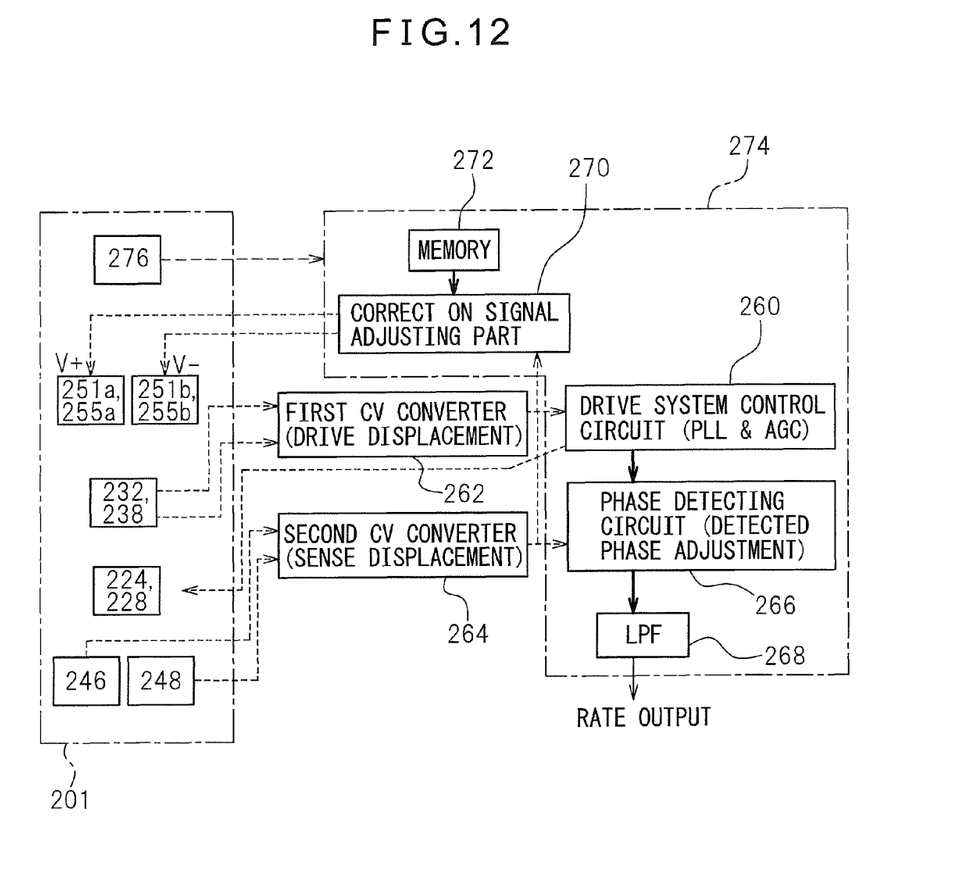
FIG. 12 is a block diagram showing a feedback system circuit for limiting rotational vibration of a sense system used in the gyro of FIG. 11.

Accordingly, in a third embodiment as shown in FIGS. 11 and 12, correction fixed electrodes arranged within left and right drive masses are configured to eliminate the influence of overlapping length L and apply desired electrostatic force for correction to each drive mass. The third embodiment is similar to the second embodiment except for the inside structure of the left and right drive masses. Therefore, in the third embodiment, like reference numerals in the series 100 are used to indicate components corresponding to respective components of the second embodiment, and the detailed explanation thereof is omitted.

FIG. 11 shows a detail of left drive mass 204 in vibration gyro 201 according to the third embodiment. Similarly to the second embodiment, drive mass 204 has two correction fixed comb electrodes 251a and 251b aligned in the Y-direction. However, in the third embodiment, each of correction fixed comb electrodes 251a and 251b has two portions, i.e., a portion where overlapping length L with respect to the comb electrode arranged on drive mass 204 is increased when the drive mass is displaced in the X-direction, and another portion where overlapping length L is decreased when drive mass 204 is displaced in the X-direction.

Concretely, in FIG. 11, upper correction fixed comb electrode 251a has fixed comb electrode 254a and 258a arranged within drive mass 204. Fixed comb electrode 254a extends opposed to a comb electrode 253a extending from a portion of drive mass 204 which is farthest from the rotational center of the sense mass (in this case, an upper portion of a side 204a farthest from rotational center C among four sides constituting drive mass 204). On the other hand, fixed comb electrode 258a extends opposed to a comb electrode 256a extending from a member 204c which extends in the −Y-direction from upper side 204b (among the four sides constituting drive mass 204) extending in the X-direction.

Similarly, in FIG. 11, lower correction fixed comb electrode 251b has fixed comb electrode 254b and 258b arranged within drive mass 204. Fixed comb electrode 254b extends opposed to a comb electrode 253b extending from a portion of drive mass 204 which is farthest from the rotational center of the sense mass (in this case, a lower portion of a side 204a farthest from rotational center C among the four sides constituting drive mass 204). On the other hand, fixed comb electrode 258b extends opposed to a comb electrode 256b extending from a member 204e which extends in the +Y-direction from lower side 204d (among the four sides constituting drive mass 204) extending in the X-direction. In other words, each of correction fixed comb electrodes 251a and 251b has a pair of comb structures extending in the opposed directions in relation to the direction of driving-vibration of the drive masses (or the X-direction), and the drive masses have comb structures which are opposed to the respective combs of the correction electrode. The same is applicable to the right drive mass.

Following equation (2) approximates electrostatic force F generated in the Y-direction, wherein DC voltages $V_+$ and $V_-$ are applied to correction fixed comb electrodes 251a and 251b, respectively, and DC potential of drive mass 204 is Vm. Other parameters in equation (2) are the same as in equation (1).

$$F = \frac{2\varepsilon HXVm}{g^2}(V_- - V_+) \\ = -\frac{4\varepsilon HXVm}{g^2}\Delta V \quad (2)$$

As is apparent from equation (2), in the third embodiment, an item, which depends on overlapping length L of the comb electrode, is canceled. Further, comparing equation (2) to a second item in the right side of equation (1), the larger electrostatic force may be obtained in the third embodiment when value X is the same.

In the third embodiment, when DC voltage is applied to left drive mass 204, the electrostatic force in the −Y-direction, corresponding to drive displacement X, is applied to left drive mass 204, whereby counterclockwise torque $T_{CCW}$ may be generated. Also, in the right drive mass, which is symmetrical to left drive mass 204 with respect to the Y-axis (B-B line) in FIG. 11, clockwise torque $T_{CW}$ may be generated when the same DC voltage is applied to the right drive mass. In other words, by appropriately adjusting the DC voltage applied to the correction fixed comb electrode arranged on each of the left and right drive masses, a correction torque ($T_{CCW}-T_{CW}$) for canceling the quadrature error (in the rotational direction of the sense mass) may be obtained. In addition, corresponding to the number of pairs of the combs opposed to each other (in the embodiment of FIG. 11, two pairs at each of the upper and lower fixed electrodes) the correction torque may be increased (i.e., when the number of pairs is N, the correction torque is increased N-times).

Further, as shown in FIG. 11, correction fixed comb electrodes 251a and 251b of left drive mass 204 are positioned in a leftmost side area within drive mass 204 (i.e., the anti-rotational center side area), and are aligned in the Y-direction (along A-A line). Since correction torque T is a product of electrostatic force F and distance La between the correction electrode and rotational center C (T=F×La), the large torque may be obtained by increasing La as possible, even when the number of pairs of the correction comb electrodes is small. The same is applicable to the right drive mass.

FIG. 12 is a block diagram showing a feedback system circuit for limiting rotational vibration of the sense system, which is capable of being applied to the vibration gyro of FIG. 11. A signal is input to a digital control system via an analogue/digital converter (ADC) (not shown). A drive system control circuit (PLL (phase locked loop) & AGC) 260 is associated with left and right drive comb electrodes 224 and 228, and a first CV converter 262 is associated with left and right monitor fixed comb electrodes 232 and 238. By means of drive system control circuit 260 and first CV converter 262, drive masses 204 and 206 are controlled and driven at predetermined anti-phase frequency and amplitude. The change in the capacitance between comb electrode 244 and monitor fixed comb electrodes 246 and 248, due to the rotational displacement of the sense mass, is converted into a voltage by a second CV converter 264. Then, the phase of the capacitance change is detected (or adjusted) by a phase detecting section (a phase sensitive demodulator circuit in the embodiment) 266 at a phase of the drive vibrational frequency in the sense system response. A bandwidth of an output after this phase detection is limited by a low-pass filter 268, and then is output as an angular velocity signal (or a rate). In such a way, the output corresponding to angular velocity Ω may be obtained.

The information, which is transmitted from monitor fixed comb electrodes 232 and 238 to drive system control circuit 260, is transmitted to a correction signal adjusting part 270 as a drive displacement signal. Correction signal adjusting part 270 adjusts the drive displacement signal based on the phase of the monitor output of the driving-vibration, and an DC control voltage applied to left correction electrodes 251a and 251b, and right correction electrode 255a and 255b symmetrical to the left comb electrodes, is determined based on the adjusted drive displacement signal (or the correction signal). Due to the manufacturing tolerances or the unbalance of the driving force, even when angular velocity Ω is zero, second CV converter 264 may generate a certain output and then a bias value may be output as a rate output, which corresponds to the quadrature error as described above. However, the amplitude of the DC control voltage can be properly adjusted by the correction signal from correction signal adjusting part 270, and thus the quadrature error may be limited. In addition, drive system control circuit 260, phase detecting circuit 266, LPF 268, correction signal adjusting part (or the adjustment circuit) 270 and a memory 272 (as described below) may be constituted as a digital control circuit 274.

The quadrature error or the orthogonal bias value has temperature dependency, and thus it is effective that correction signal adjusting part 270 output the correction signal corresponding to the operating temperature of the gyro. Hereinafter, a concrete example therefor will be explained.

First, at each preset temperature, the DC control voltage to be applied to correction electrodes 251a, 251b, 255a and 255b is determined by using the phase of the drive displacement signal when angular velocity Ω is zero. Then, the amplitude of the DC control voltage for minimizing the output (or the bias value) of second CV converter 264 is determined. In this regard, the "preset temperature" means some representative temperature values within the operating temperature of the gyro (for example, from −45 to 85 degrees C. at intervals of 5 degrees C.). Data of the amplitude of the DC control voltage, determined in such a way, is stored in memory (storage media) 272 in a proper format such as a data map or a data table. In addition, the data may be determined experimentally or computationally.

On the other hand, gyro 201 has a temperature sensor 276 for measuring the actual temperature (or the operating temperature) of the gyro. Then, correction signal adjusting part 270 generates a correction signal required to adjust the amplitude of the DC control voltage applied to the correction electrodes, based on an output (measured temperature) of temperature sensor 276 and the data corresponding to the measured temperature stored in memory 272. Based on the generated correction signal, the amplitude of the DC control voltage applied to correction electrodes 251a, 251b, 255a and 255b is adjusted.

It is preferable that temperature sensor 276 directly measure the temperature of the vibration gyro. For example, a thermistor element or a thermocouple adhered and fixed to the substrate may be used as temperature sensor 276. In this case, an amplifier for converting a resistance of the thermistor element into a voltage and/or an AD converter (not shown) for A/D converting the converted voltage or a voltage of the thermocouple are used, and temperature information is input to digital control circuit 274 (or memory 272). The input temperature information is used as information for correcting the quadrature error within the operating temperature of the gyro.

As described above, in the third embodiment, the vibration gyro has the adjusting means for canceling the quadrature error generated by the structural unbalance, by applying DC voltage to the correction electrode when the angular velocity is equal to zero, and further has the structure for canceling influence of the overlapping length between the comb electrodes. Therefore, the quadrature error may be extremely adequately limited, whereby the bias stability of the gyro may be improved.

According to the present invention, in the structure wherein the sense mass is not directly driven by the driving-vibration of the left and right drive masses, by providing the correction electrode for canceling the rotational displacement of the sense mass due to the structural unbalance, the leakage output (or the quadrature error) generated by the structural asymmetricity due to the production tolerance may be eliminated or reduced. Concretely, the rotational displacement (vibration) due to the structural or dynamical asymmetricity of the drive masses (i.e., the bias output when the input angular velocity is zero) can be reduced, by applying AC voltage of proper phase to the correction electrode adjacent the sense mass, or by applying DC voltage the correction electrode adjacent the drive mass, whereby the stability of the gyro can be dramatically improved.

When the correction electrode has the structure wherein the comb electrodes extend in the opposed directions, the appropriate electrostatic force for correction can be generated without being affected by the overlapping length of the opposed comb electrodes. Further, when the correction electrode is positioned within the drive mass and in the area which is relatively away from the rotational center of the sense mass, the high electrostatic force for correction may be obtained even when the number of the combs is small.

By previously storing data in the memory for transmitting the appropriate correction signal corresponding to the operating temperature of the gyro, and by adjusting the AC or DC voltage to be applied to the correction electrode based on the data in the memory and the measured temperature obtained by the temperature sensor which measures the operating temperature of the gyro, the quadrature error or the orthogonal bias value can be reduced corresponding to the operating temperature.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A vibration gyro comprising:
a sense mass fixed to a substrate by a second supporting element and configured to be rotatably excited about an axis perpendicular to a plane by a Coriolis force generated by an angular velocity;
drive masses on right and left sides, each drive mass being suspended inside the sense mass by a first supporting element so that each drive mass is capable of being driven and vibrated in a direction parallel to the plane,
wherein the drive masses are connected to each other by a connecting spring having elasticity in the direction of driving-vibration of the drive masses so that the drive masses represent an anti-phase vibration mode wherein the drive masses are vibrated at opposite phases, wherein the sense mass is configured to not be excited in the direction of the driving-vibration due to the driving-vibration of the drive masses; and a correction electrode positioned adjacent to the sense mass, the correction electrode configured to generate an electrostatic force by an AC voltage applied to the correction electrode based on a phase of a monitor output of the driving-vibration of the drive masses when an angular velocity is not input, to cancel a rotational torque applied to the sense mass due to the driving-vibration of the drive masses.

2. The vibration gyro as set forth in claim 1, further comprising:

a memory which stores AC voltage amplitude and phase data for limiting a quadrature error or an orthogonal bias value of the vibration gyro, the data being associated with an operating temperature of the vibration gyro;

a temperature sensor which measures a temperature of the vibration gyro; and a correction signal adjusting part which generates a correction signal for adjusting an amplitude of an AC control voltage with a specific phase applied to the correction electrode, based on a measured value of the temperature sensor, the AC voltage amplitude and the phase data stored in the memory.

3. A vibration gyro comprising:

a sense mass fixed to a substrate by a second supporting element and configured to be rotatably excited about an axis perpendicular to a plane by a Coriolis force generated by an angular velocity;

drive masses on right and left sides, each drive mass being suspended inside the sense mass by a first supporting element so that each drive mass is capable of being driven and vibrated in a direction parallel to the plane, wherein the drive masses are connected to each other by a connecting spring having elasticity in the direction of driving-vibration of the drive masses so that the drive masses represent an anti-phase vibration mode wherein the drive masses are vibrated at opposite phases, wherein the sense mass is configured not to be excited in the direction of the driving-vibration due to the driving-vibration of the drive masses; and a correction electrode positioned adjacent to the drive mass, the correction electrode configured to generate an electrostatic force by a DC voltage applied to the correction electrode when an angular velocity is not input, to cancel a rotational torque applied to the sense mass due to the driving-vibration of the drive masses.

4. The vibration gyro as set forth in claim 3, wherein the correction electrode has a pair of combs extending in an opposite direction to the direction of driving-vibration of the drive masses, and wherein the drive masses have comb structures which are opposed to respective combs of the correction electrode.

5. The vibration gyro as set forth in claim 4, wherein the correction electrode is arranged within each drive mass and is fixed close to a portion of each drive mass farthest from a rotational center of the sense mass.

6. The vibration gyro as set forth in claim 3, further comprising:

a memory which stores DC voltage data for limiting a quadrature error or an orthogonal bias value of the vibration gyro, the data being associated with an operating temperature of the vibration gyro;

a temperature sensor which measures a temperature of the vibration gyro; and a correction signal adjusting part which generates a correction signal for adjusting an amplitude of an DC control voltage applied to the correction electrode, based on a measured value of the temperature sensor and the DC voltage data stored in the memory.

* * * * *